US008224482B2

(12) United States Patent
Schedel et al.

(10) Patent No.: US 8,224,482 B2
(45) Date of Patent: Jul. 17, 2012

(54) AUTOMATED PILL DISPENSING SYSTEMS CONFIGURED FOR DETECTING BOTTLES IN OUTPUT CHUTES AND RELATED METHODS OF OPERATION

(75) Inventors: Jeffrey J. Schedel, Apex, NC (US); James Robert Rivenbark, Jr., Raleigh, NC (US); Mark Alan Uebel, Morrisville, NC (US); Thomas H. S. Gordon, Cary, NC (US)

(73) Assignee: Parata Systems, LLC, Durham, NC (US)

( * ) Notice: Subject to any disclaimer, the term of this patent is extended or adjusted under 35 U.S.C. 154(b) by 648 days.

(21) Appl. No.: 12/350,568

(22) Filed: Jan. 8, 2009

(65) Prior Publication Data

US 2009/0177316 A1 Jul. 9, 2009

Related U.S. Application Data

(60) Provisional application No. 61/019,692, filed on Jan. 8, 2008.

(51) Int. Cl.
*G06F 17/00* (2006.01)

(52) U.S. Cl. ........ 700/240; 700/241; 700/236; 700/243; 221/14

(58) Field of Classification Search .......... 700/242–243, 700/231, 232, 236, 240, 241; 221/14
See application file for complete search history.

(56) References Cited

U.S. PATENT DOCUMENTS

| | | | | |
|---|---|---|---|---|
| 5,337,919 | A | 8/1994 | Spaulding et al. | |
| 5,783,909 | A | 7/1998 | Hochstein | |
| 6,006,946 | A | 12/1999 | Williams et al. | |
| 6,036,812 | A | 3/2000 | Williams et al. | |
| 6,176,392 | B1 | 1/2001 | William et al. | |
| 6,384,402 | B1 | 5/2002 | Hair, III et al. | |
| 6,794,634 | B2 | 9/2004 | Hair, III et al. | |
| 6,910,601 | B2 | 6/2005 | Thomas et al. | |
| 6,971,541 | B2 | 12/2005 | Williams et al. | |
| 7,121,944 | B2 | 10/2006 | Gauselmann | |
| 7,191,915 | B2 | 3/2007 | Hair, III et al. | |
| 7,228,198 | B2 * | 6/2007 | Vollm et al. | 700/235 |
| 7,299,977 | B2 | 11/2007 | Eastman et al. | |
| 7,343,220 | B2 * | 3/2008 | Hair et al. | 700/236 |
| 7,404,645 | B2 | 7/2008 | Margulis | |
| 7,575,129 | B2 * | 8/2009 | Yuyama et al. | 221/241 |
| 2004/0204791 | A1 | 10/2004 | Hair, III et al. | |
| 2005/0113967 | A1 * | 5/2005 | Kim | 700/236 |
| 2008/0110921 | A1 * | 5/2008 | DuMond et al. | 221/76 |
| 2008/0121648 | A1 | 5/2008 | Hair et al. | |
| 2008/0173663 | A1 * | 7/2008 | Moran et al. | 221/93 |

* cited by examiner

*Primary Examiner* — Michael K Collins
(74) *Attorney, Agent, or Firm* — Myers Bigel Sibley & Sajovec, P.A.

(57) ABSTRACT

An automated pill dispensing system includes an output chute configured to hold pill-containing vials and an optical sensor located at a predetermined location in the output chute. The optical sensor includes an optical emitter and an optical detector configured to be operated cooperatively to output a detection signal indicating a presence or absence of a vial at the predetermined location of the output chute. A controller is coupled to the optical sensor and is configured to receive the detection signal therefrom, detect the presence or absence of the vial at the predetermined location of the output chute in response to the detection signal, and control a next depositing event whereby a next vial is deposited in the output chute responsive to the detection. Related methods of operation are also discussed.

21 Claims, 14 Drawing Sheets

AUTOMATED PILL DISPENSING SYSTEMS CONFIGURED FOR DETECTING BOTTLES IN OUTPUT CHUTES AND RELATED METHODS OF OPERATION

CROSS-REFERENCE TO RELATED APPLICATIONS

This application claims priority from U.S. Provisional Patent Application No. 61/019,692, filed Jan. 8, 2008 and entitled Method Of Detecting The Presence Of Pill Bottles In A Chute, the disclosure of which is hereby incorporated herein in its entirety.

FIELD OF THE INVENTION

The present invention relates to systems for filling prescriptions, and more particularly to automated systems for dispensing containers, such as pill-containing bottles or vials, and related methods of operation.

BACKGROUND OF THE INVENTION

Pharmacy generally began with the compounding of medicines which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate the pharmacy environment. Different exemplary approaches are shown in U.S. Pat. No. 5,337,919 to Spaulding et al. and U.S. Pat. Nos. 6,006,946; 6,036,812 and 6,176,392 to Williams et al. The Williams system conveys a bin with tablets to a counter and a vial to the counter. The counter dispenses tablets to the vial. Once the tablets have been dispensed, the system returns the bin to its original location and conveys the vial to an output device. Tablets may be counted and dispensed with any number of counting devices. Drawbacks to these systems typically include the relatively low speed at which prescriptions are filled and the absence in these systems of securing a closure (i.e., a lid) on the container after it is filled.

One additional automated system for dispensing pharmaceuticals is described in some detail in U.S. Pat. No. 6,971,541 to Williams et al. This system has the capacity to select an appropriate vial, label the vial, fill the vial with a desired quantity of a selected pharmaceutical tablet, apply a cap to the filled vial, and convey the labeled, filled, capped vial to an offloading station for retrieval.

Although this particular system can provide automated pharmaceutical dispensing, certain of the operations may be improved. For example, in some automated pill dispensing systems, the filled pill vials may be output to an offload chute for retrieval by a pharmacist or other human operator. However, such systems typically rely on the pharmacist or other operator to scan the label of a retrieved pill vial in order to determine that the pill vial has been removed from the chute, which may introduce the potential for error and/or system malfunction.

SUMMARY OF THE INVENTION

According to some embodiments of the present invention, an automated pill dispensing system includes an output chute configured to hold pill-containing vials and an optical sensor located at a predetermined location in the output chute. The optical sensor includes an optical emitter and an optical detector configured to be operated cooperatively to output a detection signal indicating a presence or absence of a vial at the predetermined location of the output chute. A controller is coupled to the optical sensor and is configured to receive the detection signal therefrom, detect the presence or absence of the vial at the predetermined location of the output chute in response to the detection signal, and control a next depositing event whereby a next vial is deposited in the output chute responsive to the detection.

In some embodiments, the system may include a filter circuit coupled between the controller and the optical sensor. The filter circuit may be configured to adjust the detection signal output from the optical sensor to account for ambient light conditions prior to receipt thereof by the controller. For example, the optical sensor may be configured to output an ambient light signal indicative of the ambient light conditions prior to output of the vial detection signal therefrom, and the filter circuit may be configured to provide a filtered vial detection signal representing a difference between the detection signal and the ambient light signal.

In other embodiments, the controller may be configured to correlate the detection signal to a present sample value, compare the present sample value to a current output value, wherein the current output value is based on a previous sample value, increment or decrement the current output value by an offset value in response to the comparison to update the current output value, and detect the presence or absence of the vial at the predetermined location of the output chute responsive to the updated current output value.

In still other embodiments, the controller may be configured to increment a counter value in response to each depositing event, and alter the counter value responsive to the detection signal from the optical sensor. For example, when the counter value indicates that the chute is full, the controller may be configured to decrease the counter value to a predetermined counter value responsive to detecting the absence of the vial at the predetermined location of the output chute based on the detection signal. Alternatively, when the counter value indicates that the chute is not full, the controller may be configured to increase the counter value to a predetermined counter value indicating that the chute is full responsive to detecting the presence of the vial at the top portion of the output chute based on the detection signal. In some embodiments, the controller may be further configured to control the next depositing event in response to the altered counter value.

According to other embodiments of the present invention, in a method of operating an automated pill dispensing system including an output chute configured to hold pill-containing vials and an optical sensor at a predetermined location therein, a detection signal is received from the optical sensor. A presence or absence of a vial at the predetermined location of the output chute is detected responsive to the detection signal. A next depositing event, whereby a next vial is deposited in the output chute, is controlled responsive to the detection.

Although described above primarily with respect to system and method aspects of the present invention, it will be understood that the present invention may also be embodied as computer program products.

DETAILED DESCRIPTION OF EMBODIMENTS OF THE INVENTION

Figure 1:
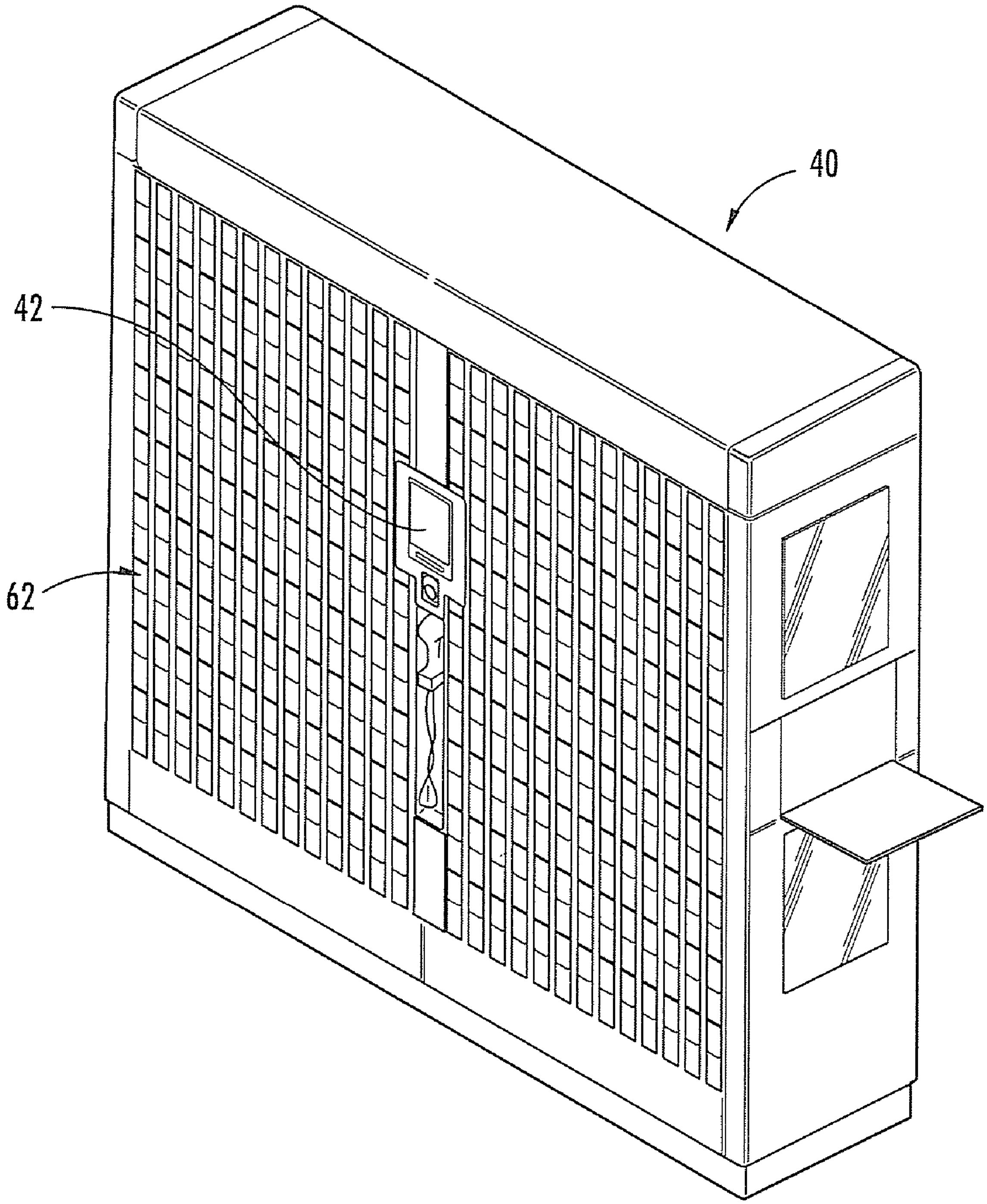
FIG. 1 is a top, front perspective view of a pharmaceutical dispensing system according to some embodiments of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

It will also be understood that, although the terms first, second, etc. may be used herein to describe various elements, these elements should not be limited by these terms. These terms are only used to distinguish one element from another.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Some embodiments may be embodied in hardware (including analog circuitry and/or digital circuitry) and/or in software (including firmware, resident software, micro-code, etc.). Consequently, as used herein, the term "signal" may take the form of a continuous waveform and/or discrete value (s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "circuit" and "controller" may take the form of digital circuitry, such as a logic gate array and/or computer-readable program code executed by an instruction processing device(s) (e.g., general purpose microprocessor and/or digital signal processor), and/or analog circuitry. Although some of the diagrams include arrows on communication paths to show a primary direction of communication, it is to be understood that communication may occur in the opposite direction to the depicted arrows. Well-known functions or constructions may not be described in detail for brevity and/or clarity.

Some embodiments of the present invention may arise from realization that, in an automated pill dispensing system, the ability to detect the presence of a pill-containing bottle or vial in an offload or output chute may be important to determine when the chute is full and can no longer hold any more bottles. Accordingly, embodiments of the present invention provide systems and methods used to detect the presence or absence of a pill bottle in the chute. Such detection can be difficult to accomplish due to the number of variables involved. For example, when using an optical sensor for detection, it may be difficult to detect transparent vials, especially when the vials are empty and/or unlabeled. Also, ambient lighting conditions may present problems in optically detecting the presence or absence of vials in a chute.

Figure 2:
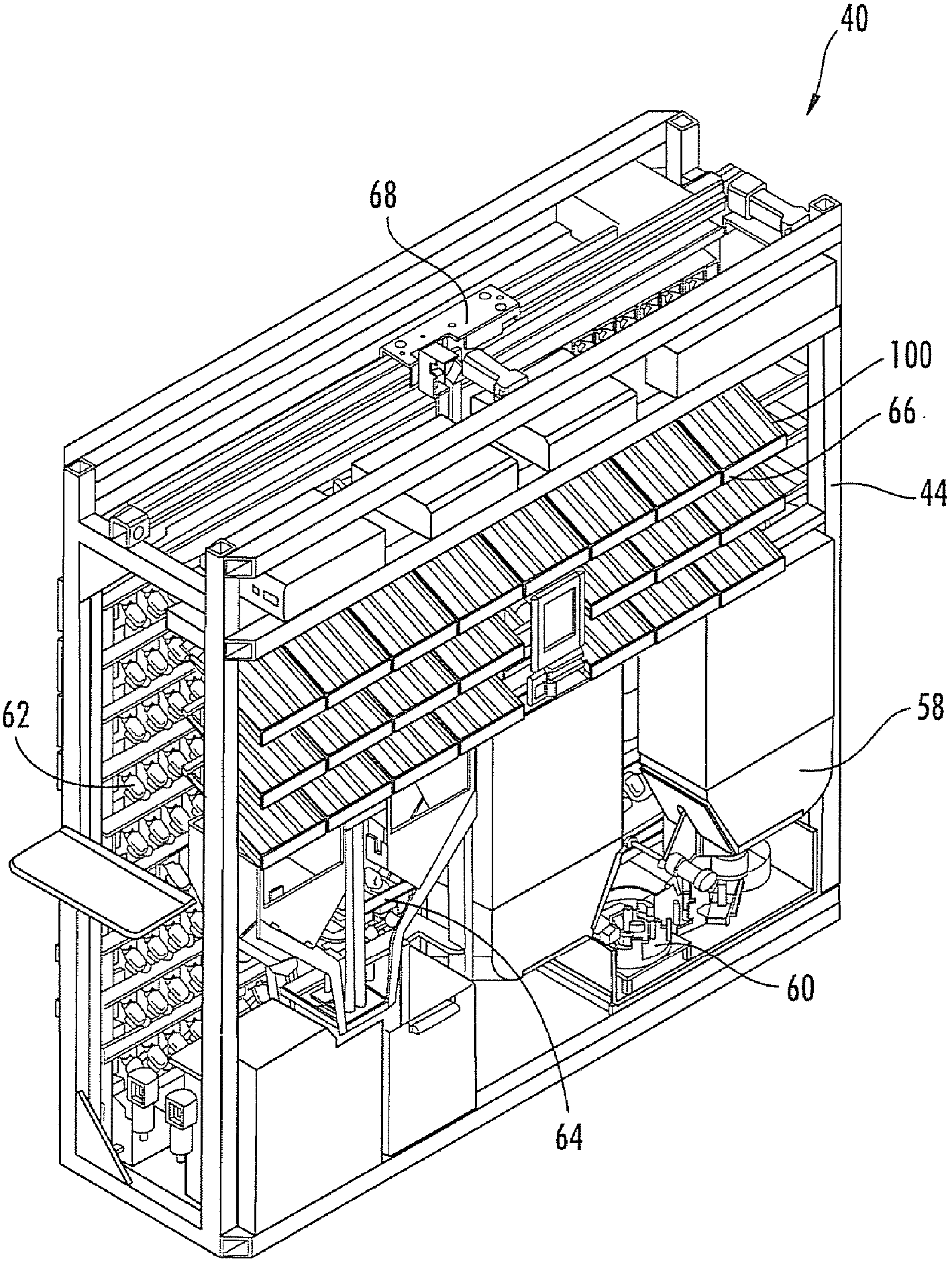
FIG. 2 is a top, rear perspective view of the system of FIG. 1 with the outer panel of the system removed to show the internal components.

An automated pill dispensing system according to some embodiments of the present invention is illustrated in FIGS. 1 and 2 and is designated broadly therein at 40. The system 40 includes a support frame 44 for the mounting of its various components. The system 40 generally includes a controller 42 (represented herein by a graphics user interface monitor), a container dispensing station 58, a labeling station 60, a tablet dispensing station 62, a closure station 64, and an offloading station 66. In the illustrated embodiment, containers, tablets and closures are moved between these stations with a single carrier 68; however, in some embodiments only a single carrier may be employed, or one or more additional carriers may be employed. The operation of the container dispensing station 58, the labeling station 60, the tablet dispensing station 62, and the closure station 64 are described in, for example, U.S. patent application Ser. Nos. 11/599,526; 11/599,576; 11/679,850; and 11/111,270, the disclosures of each of which are hereby incorporated herein in its entirety.

Figure 3:
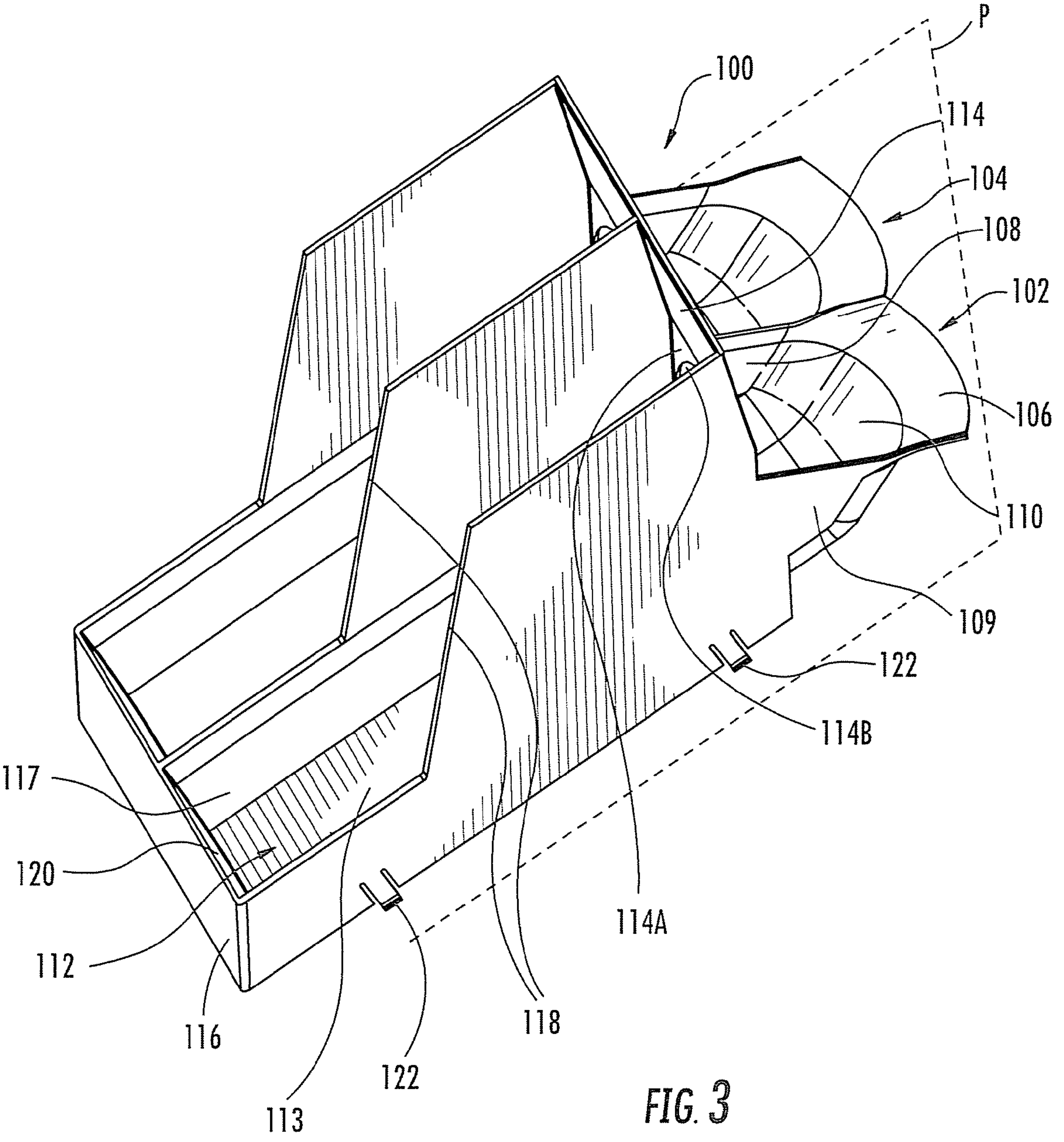
FIG. 3 is an isometric view of an offload chute unit according to some embodiments of the present invention.

Turning now to FIG. 2, the offload station 66 includes a number of chute units 100, each of which, in the illustrated embodiment of FIG. 3, includes two offload or output chutes 102, 104, although those skilled in this art will appreciate that a chute unit may include only a single chute or may include more than two chutes. Also, the offload station 66 may include only a single chute unit or any appropriate number of chute units.

As shown in FIG. 3, the chutes 102, 104 are substantially identical mirror images of each other about a vertical plane P. As such, only the chute 102 will be described in detail herein, with the understanding that the description is equally applicable to the chute 104. For the purpose of this discussion, the terms "front," "forward" and derivatives thereof refer to the direction that a pharmaceutical vial travels in the chute 102, i.e., from right to left from the vantage point of FIG. 3. The terms "rear", "back" and derivatives thereof refer to the direction that is opposite of the "forward" direction, i.e., from left to right from the vantage point of FIG. 3. One may also think of the forward direction as extending "downstream" from the top to the bottom of the chutes 102, 104 and the rearward direction as extending "upstream" from the bottom to the top of the chutes 102, 104.

Referring again to FIG. 3, the chute 102 has a rear lip 106 that resides above the frame 44. The lip 106 includes a shallow arc such that it is slightly concave. The lip 106 merges smoothly at its front end with a concave ramp 110. Side walls 108,109 rise from the lateral edges of the ramp 110, with the forward ends of the side walls 108, 109 being higher than the rearward ends. The effect of the configuration provided by the lip 106, the ramp 110 and the side walls 108, 109 is that of a half-bowl that drains downwardly into the remainder of the chute 102. The lower portion of the ramp 110 rests on the frame 44.

Figure 4A:
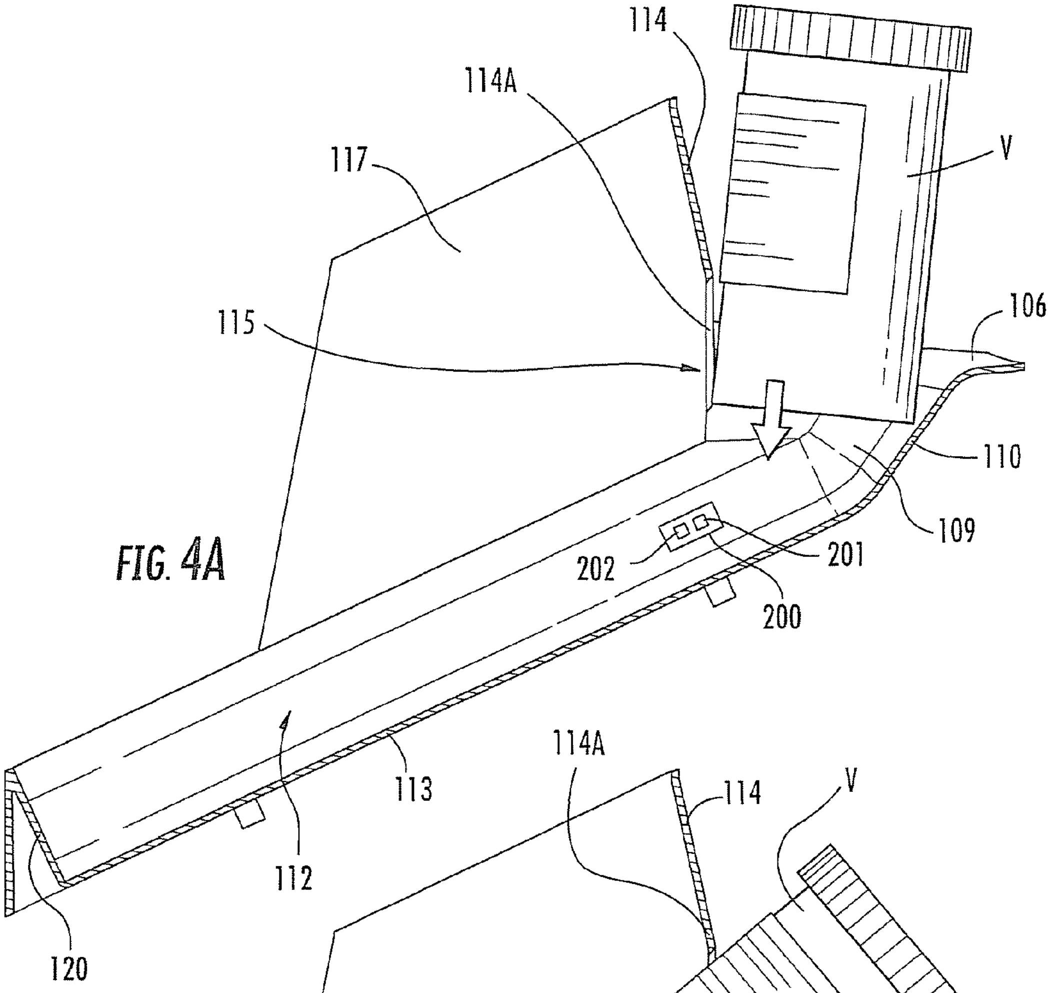
FIGS. 4A-4E are sequence views illustrating vials traveling through the chute unit of FIG. 3, the chute unit being shown in side section view.
Figure 4B:
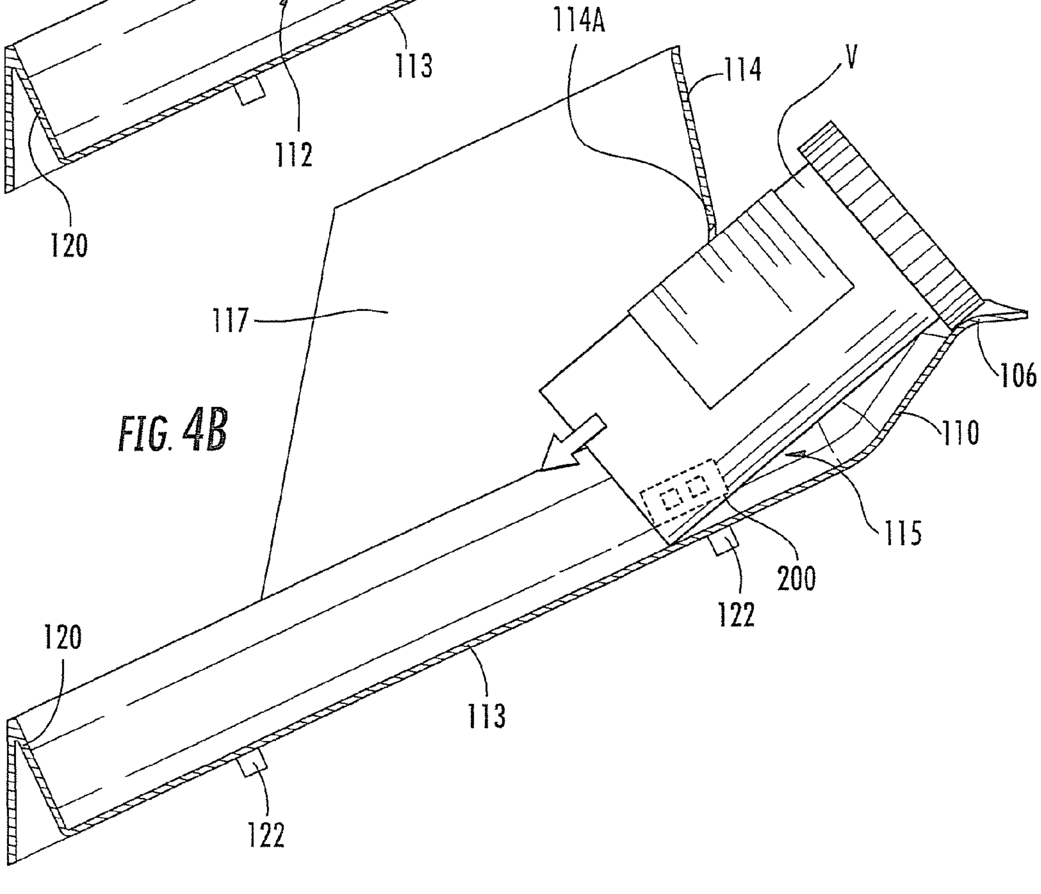
Figure 4C:
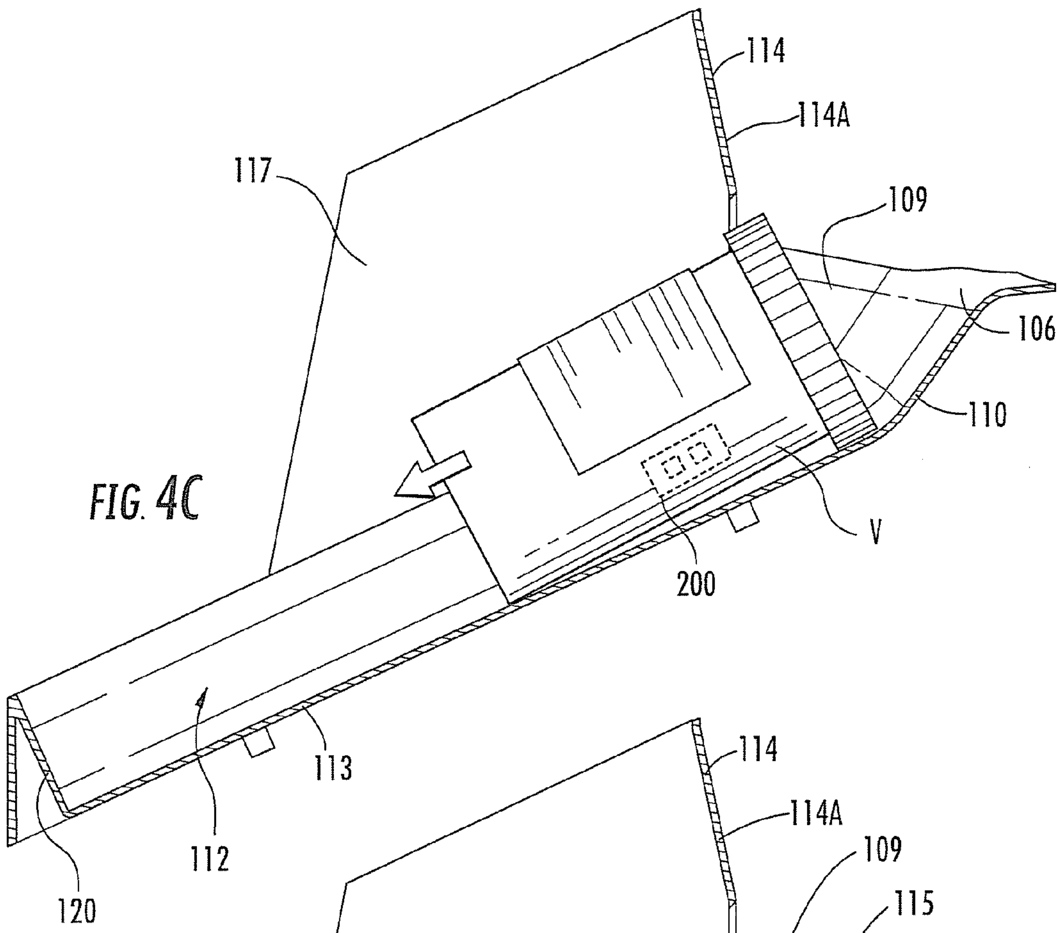

Still referring to FIG. 3, a trough 112 having an arcuate profile extends forwardly and downwardly from the front end of the ramp 110. The trough 112 includes a concave floor 113 that is bounded at its lateral edges by dividers 116,117. A rear wall 114 rises above the rear end of the trough 112; the bottom portion 114*a* of the rear wall 114 angles rearwardly and has an arcuate lower edge 114*b* that, in combination with the rear end of the floor 113, forms an inlet 115 configured to accept a pill-containing vial (see FIG. 4A). At their rearward ends, the dividers 116, 117 are similar in height to the rear wall 114. Each of the dividers 116, 117 has a leading edge 118 that slopes sharply downward in a central portion of the divider 116, 117, such that the forward portion of the divider 116, 117 is relatively low. A front wall 120 spans the front ends of the troughs 112 and provides a landing area for vials. The front wall 120 may have a foam or other shock absorbent material attached thereto to reduce any rebound effect of the vial dropping down the chute 102 and striking the front wall 120.

The chute unit 100 is attached to the frame 44 via four latches 122. The latches 122 are inserted into mating apertures (not shown) in the frame 44. In the illustrated embodiment, the chute unit 100 is mounted so that the troughs 112 slope downwardly from back to front; for example, the chute unit 100 may be mounted such that the trough 112 is angled relative to a horizontal plane at an angle of between about 20 and 35 degrees. Accordingly, when a vial is inserted into the inlet 115, the vial travels downwardly from the back of the chute 102, and comes to rest at the front wall 120 of the chute 102, as discussed in greater detail below with reference to FIGS. 4A-4E.

Referring now to FIGS. 4A-4E, in operation, after a vial V has been dispensed, labeled, filled and capped, it is transported by the carrier 68 to the offload station 66 to be deposited in one of the chutes, also referred to herein as a "depositing event." The carrier 68 deposits the vial V "right-side up" into the half-bowl formed by the lip 106, the side walls 108, 109, and the ramp 110 (see FIG. 4A); the angled bottom portion 114*a* of the rear wall 114 can also assist in funneling the vial V into position. In some embodiments, the dimensions of the lip 106, ramp 110, side walls 108, 109 and bottom portion 114*a* of the rear wall 114 are selected to ensure that a "right side up" vial V presented by the carrier 68 exits the "half-bowl" with the lower (i.e., non-capped) end leading the upper, capped end, irrespective of which of multiple common vial sizes is presented (see FIG. 4B). Typically, the length of a capped vial V is between about 2 and 4 inches, and the diameter is between about 1.25 and 2.0 inches. In some embodiments, the distance between the side walls 108, 109 is between about 2.5 and 2.75 inches, the ramp 110 has a depth of about 1.5 to 2.0 inches, the distance from the rear edge of the ramp 110 to the rear edge of the bottom portion 114*a* of the rear wall 114 is between about 3.25 and 3.5 inches, and the ramp 110 generally forms an angle of between about 20 and 30 degrees relative to an underlying horizontal surface.

Once the vial V enters the half-bowl formed by the ramp 110, the side walls 108, 109 and the lip 106, the vial V, oriented "non-capped end down", slides through the inlet 115 (see FIG. 4C) and down the trough 112 to the front wall 116 (see FIG. 4D), where it rests until pharmacy personnel remove it. In some embodiments, the chute 102 may be configured to hold at least two vials V1, V2 at once in a stacked arrangement (see FIG. 4E). As such, the trough 112 may have a length of between about 9 and 10 inches in some embodiments, which enables two vials 4 inches in length to be stored and accessible for pharmacy personnel. However, in other embodiments, the chute 102 may have a length sufficient to store fewer or more vials. Also, in other embodiments, the inlet 115 may be configured to accept "sideways" insertion of vials, such that a vial may rotate about its long axis to roll down the chute 102. Also, vials of different sizes can be stored in chutes 102, 104. A machine with similar capabilities is described in U.S. patent application Ser. No. 11/755,249, the disclosure of which is hereby incorporated by reference herein in its entirety.

As shown in FIGS. 4A-4E, the chute unit 100 further includes an optical sensor 200 in each of the chutes 102, 104. The optical sensor 200 includes an optical emitter 201, such as a light-emitting diode (LED), and an optical detector 202 configured to be operated cooperatively to output a detection signal indicating a presence or absence of a vial in the chute 102. In particular, the optical emitter 201 is configured to output an optical signal, and the optical detector 202 configured to receive at least a portion of the optical signal from the optical emitter 201 and output an electrical signal representative of the portion of the received optical signal. In the illustrated embodiments, the optical sensor 200 is illustrated as a reflective-type optical sensor that detects the presence of an object based on a reflection of the optical signal from a vial in the chute; however, it is to be understood that other types of optical sensors (for example, beam-break type sensors) may be used in other embodiments.

Figure 4D:
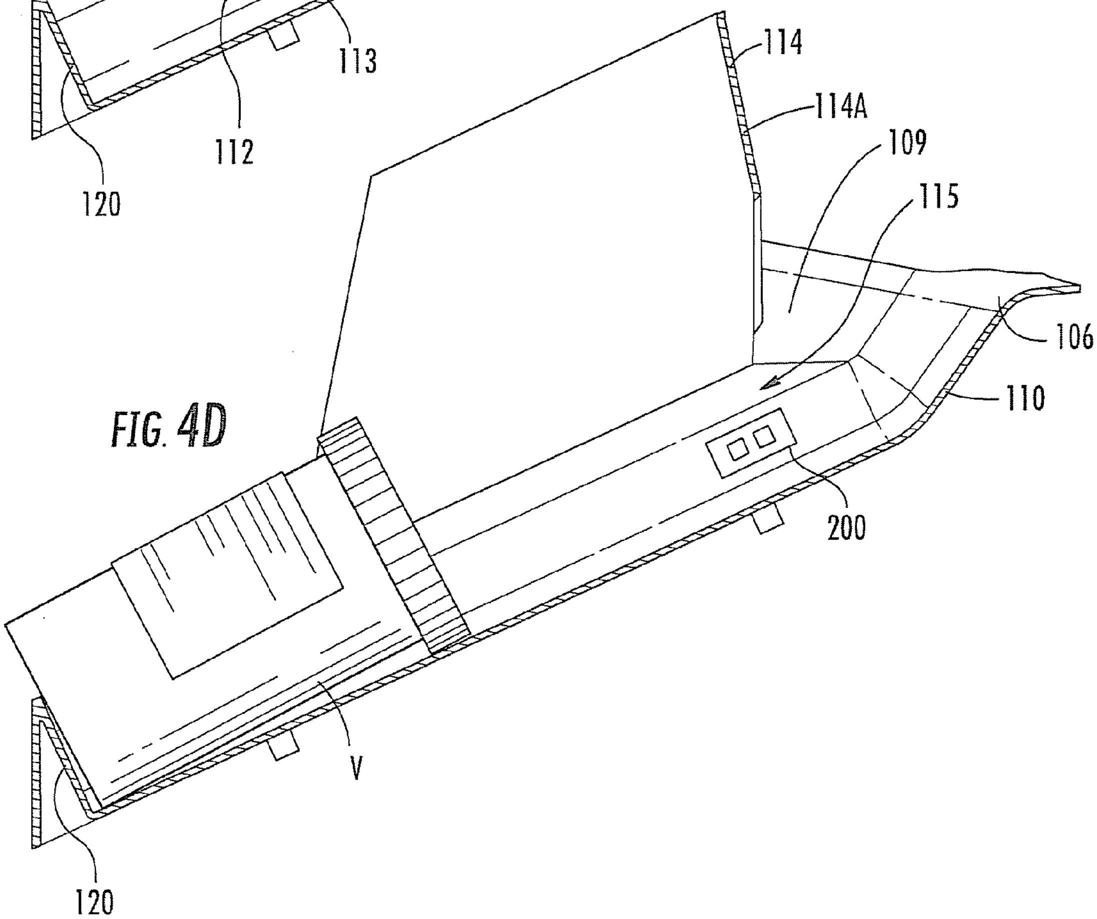

For example, as shown in FIG. 4D, when only a single vial V is present in the chute 102, the portion of the chute 102 adjacent the optical sensor 200 is vacant. As such, the optical emitter 201 outputs an optical signal which is not reflected back by a vial, and thus, little (if any) of the optical signal is received by the optical detector 202. In response, the optical detector 202 outputs an electrical signal representative of the intensity of the received optical signal, which, as noted above, is substantially zero. Thus, the electrical signal output from the optical detector 202 indicates an absence of a vial in the chute 102 at the location of the optical sensor 200. The system 40 may thereby detect that the chute 102 is not full, and may control a next depositing event by directing the carrier 68 to continue to deposit vials into the chute 102 in response to the signal from the optical sensor 200.

Figure 4E:
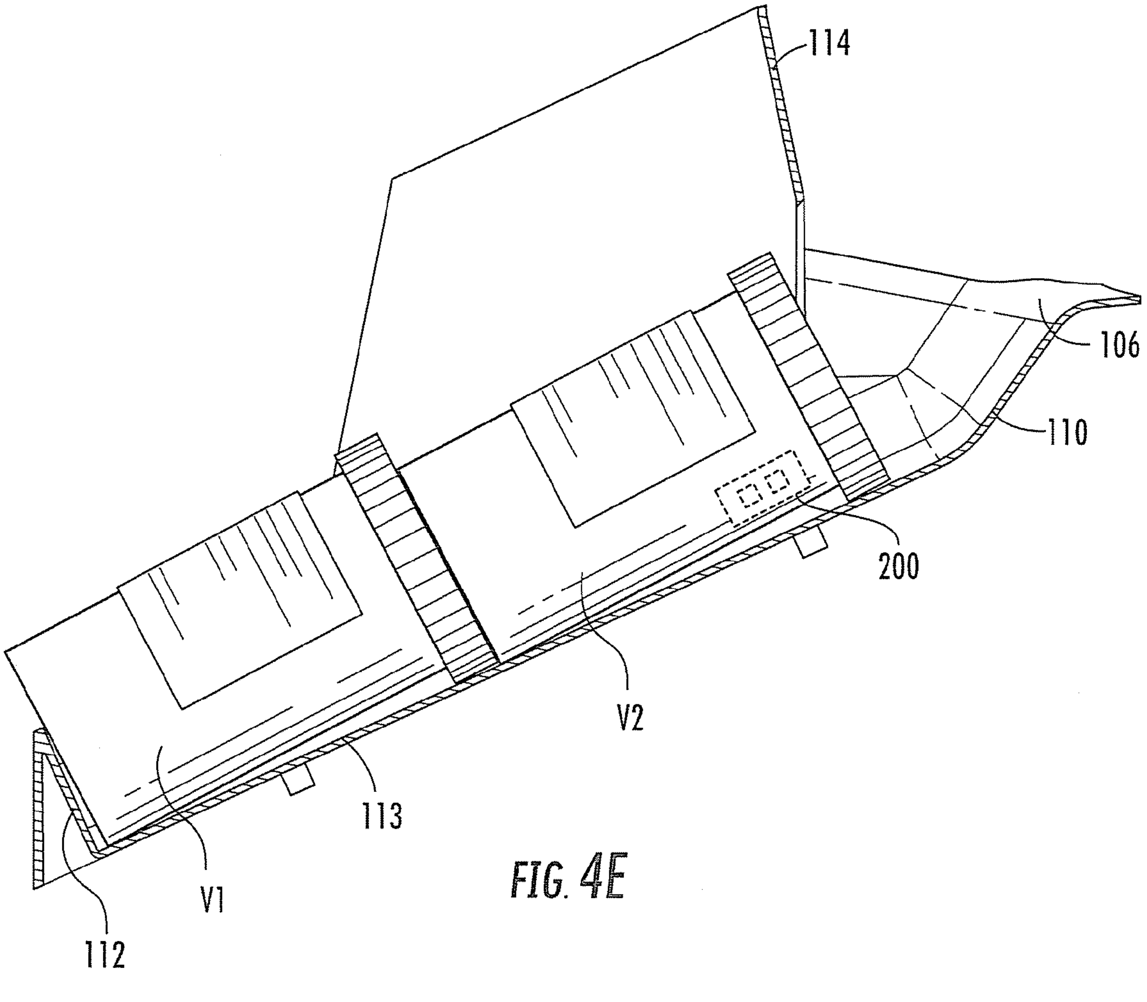

In contrast, as shown in FIG. 4E, two vials V1, V2 are present in the chute 102, such that the portion of the chute 102 adjacent the optical sensor 200 is occupied. Accordingly, the optical signal output from the optical emitter 201 is at least partially reflected by the vial V2, and at least a portion of the optical signal is received at the optical detector 202. The degree of reflection of the optical signal, and thus, the intensity of the optical signal received at the optical detector 202, may depend on several factors, such as whether the vial V2 is opaque or transparent, full or empty, and/or labeled or unlabeled. In response to receiving a portion of the optical signal output from the optical emitter 201, the optical detector 202 outputs an electrical signal representative of the intensity of the received optical signal, which, in FIG. 4E, is sufficient to indicate the presence of the vial in the chute 102 at the location of the optical sensor 200. The system 40 may thereby detect that the chute 102 is full, and may direct the carrier 68 to stop depositing vials into the chute 102 in response to the signal from the optical sensor 200. The system 40 may also direct the carrier 68 to deposit vials to an alternate chute and/or provide a visible/audible alert signal to the pharmacy personnel indicating that the chute 102 is full.

In some embodiments, the controller 42 of the system 40 may communicate with a user interface application that is configured to increment a counter value in response to each depositing event whereby a vial is deposited in a particular chute 102 to count or keep track of the number of vials that have been deposited in the chute 102. The user interface application may provide an indication of its count of the number of vials currently in the chute 102 via a graphical user interface (GUI), which may be provided in the support frame 44 and/or in an external PC (not shown). The system 40 may further include a scanner (not shown), which may be used by the pharmacy personnel to scan the labels of vials that are removed from the chute 102. The scanner may thereby send a signal to the controller 42 indicating that those vials have been removed from the chute 102. As such, the user interface application may decrement the counter value to update its count of the number of vials currently in the chute 102 in response to the signal from the scanner. However, as the pharmacy personnel may forget to scan every vial that is removed from the chute 102, the user interface application may be further configured to alter the counter value in certain situations in response to the detection signal from the optical sensor 200 in the chute 102, such as when the detection signal indicates a result that is inconsistent with the counter value. For example, when the current counter value indicates that the chute 102 is full, but the electrical signal from the optical detector 202 indicates an absence of a vial in the chute 102 at the location of the optical sensor 200, the controller 42 may direct the carrier 68 to deposit the next vial in the chute 102 and notify the user interface application, which may decrease the current counter value and update the GUI to reflect the absence of the vial at the location of the sensor 200. In some other embodiments of the present invention, the controller 42 may be further configured to control the carrier 68 to deposit the next vial in the output chute 102 when the altered counter value is less than a predetermined counter value indicating that the chute 102 is full.

On the other hand, when the current counter value indicates that the chute 102 is not full, but the electrical signal from the optical detector 202 indicates a presence of a vial in the chute 102 at the location of the optical sensor 200, the controller 42 may direct the carrier 68 to deposit the next vial in an alternate output chute and notify the user interface application, which may increase the current counter value and update the GUI to reflect the presence of the vial at the location of the sensor 200. The counter value may be increased or decreased to a predetermined counter value that corresponds to the location of the optical sensor 200 in the output chute 102. For instance, when the sensor 200 is located at a position in the chute that corresponds to the chute 102 being filled with at least five vials, the current counter value may be altered to a value of '5' in response to receiving the signal from the optical detector 202. In some other embodiments of the present invention, the controller 42 may be further configured to control the carrier 68 to deposit the next vial in an alternate output chute when the altered counter value is greater than or equal to a counter value indicating that the chute is full.

Although illustrated in FIGS. 4A-4E at a particular location at the top/back end of the chute, it will be understood that the optical sensor 200 may be provided at other locations in the chute in some embodiments. Also, more than one sensor 200 may be provided in the chute to detect varying degrees of fullness of the chute. For example, in a chute configured to hold three vials, three optical sensors 200 may be included in the chute, one at each position that corresponds to a resting location of a vial in the chute, to detect the presence or absence of a vial at any of the three possible positions in the chute.

Figure 5A:
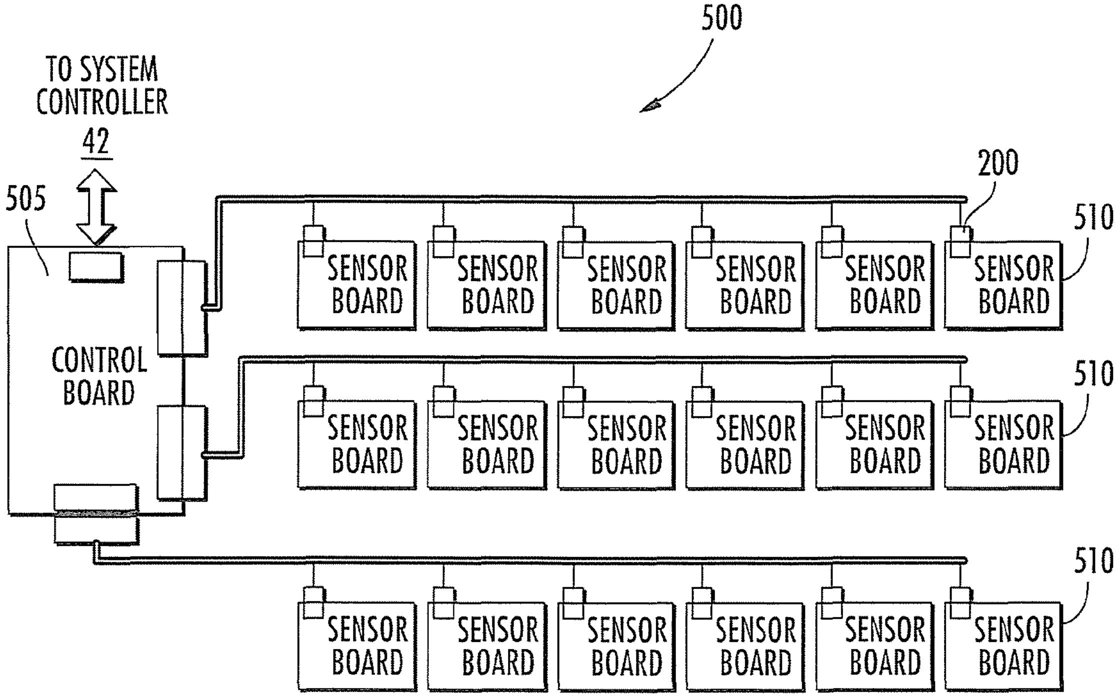
FIG. 5A is schematic diagram illustrating a system for communication between a controller circuit board and a plurality of sensor circuit boards in accordance with some embodiments of the present invention.

FIG. 5A illustrates communication between the optical sensors in each of the chutes and a controller according to some embodiments of the present invention. As shown in FIG. 5A, the communication system 500 includes a controller circuit board 505 and a plurality of sensor circuit boards 510. The controller circuit board 505 is communicatively coupled to (and/or may be implemented as a part of) a system controller, such as the controller 42 of FIG. 1. The sensor boards 510 are each coupled to an optical sensor 200, which may be located in each output chute as illustrated in FIGS. 4A-4E. However, those skilled in the art will appreciate that a sensor board 510 may be coupled to more than one optical sensor in some embodiments.

Figure 5B:
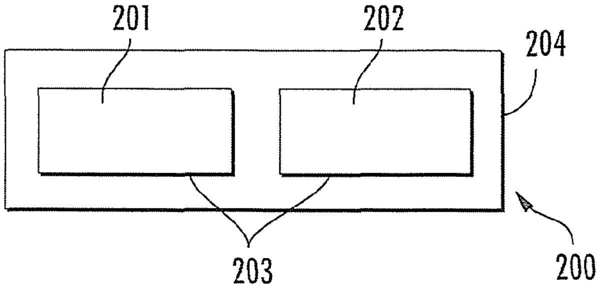
FIG. 5B is a plan view illustrating an optical sensor of one of the sensor boards of FIG. 5A.

In particular, as shown in FIG. 5A, each sensor circuit board 510 includes the optical sensor 200, and is mounted with the sensor 200 at a specific location in each output chute such that, when the output signal from the sensor 200 indicates the presence of vial at that location, the controller circuit board 505 can detect that the chute is full. In the embodiments described herein, the optical sensor 200 is an infrared (IR) reflecting type sensor. As shown in FIG. 5B, the optical sensor 200 may be provided in a surface mount package 204 that includes both the optical emitter 201 and the optical detector 202. The top of the package 204 has two windows 203, one for the emitter 201 and one for the detector 202. The sensor 200 is located in each chute adjacent to the resting location of the vial that is to be detected. Thus, when a vial is located next to the sensor 200 in the chute, the optical signal provided from the emitter 201 will be reflected back to the detector 202. This reflected light will be seen at the detector 202, which will cause the detector 202 to generate a voltage relative to the brightness of the light reflected. This voltage is provided as an electrical output signal to the controller circuit board 505 to be read and analyzed.

Referring again to FIG. 5A, the control circuit board 505 includes signal processing components for detecting a vial in a chute. Each chute sensor 200 is connected back to the controller circuit board 505 via its respective sensor circuit board 510 so that its output signal may be read. Accordingly, signals from the sensors 200 in each output chute are relayed back to the controller board 505 via the sensor boards 510. The controller circuit board 505 may thereby provide the status of any one chute to the main system controls.

Figure 6:
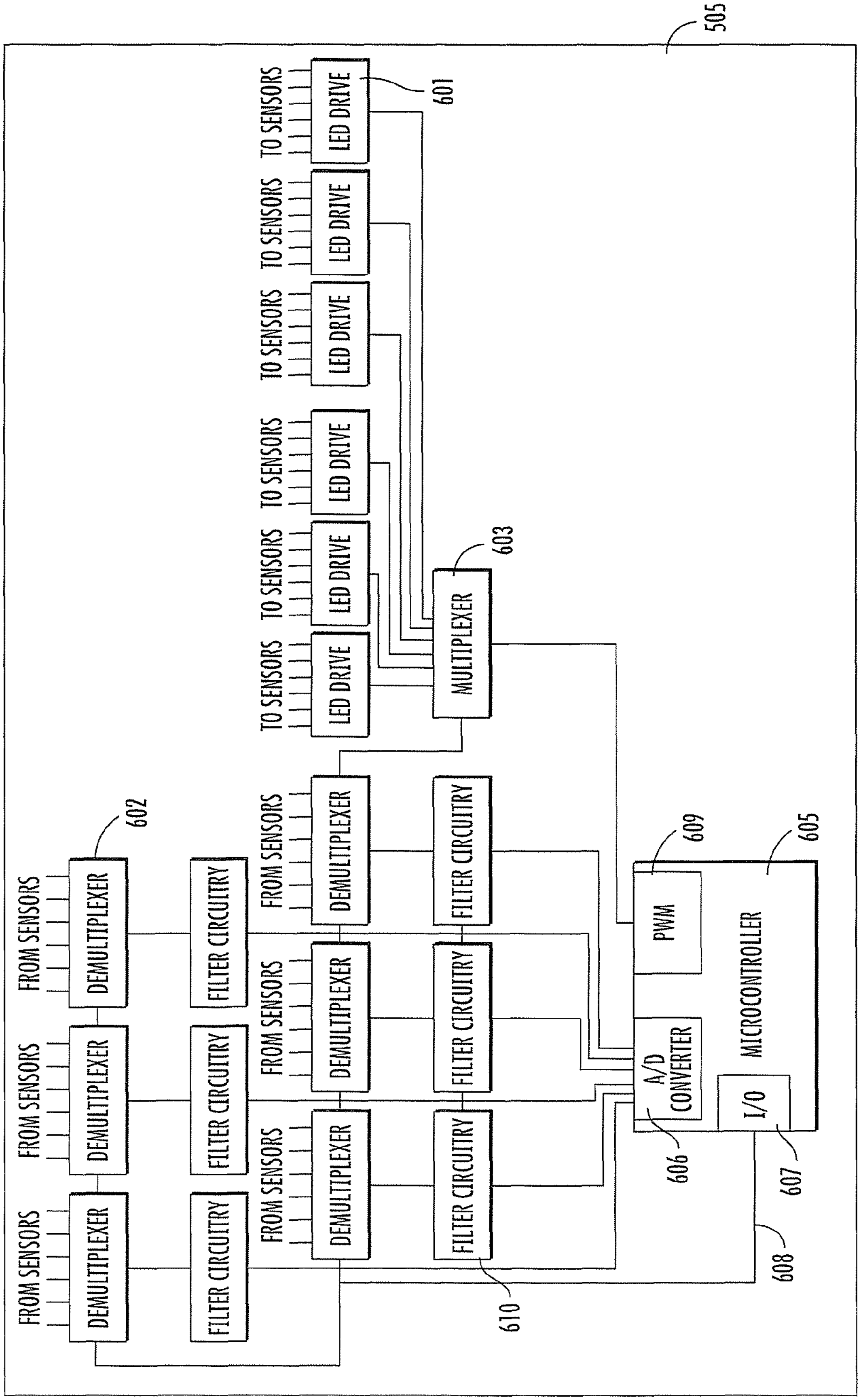
FIG. 6 is schematic diagram further illustrating the controller board of FIG. 5.

FIG. 6 illustrates the main hardware components of the controller circuit board 505 of FIG. 5A. Referring now to FIG. 6, the controller circuit board 505 includes the LED driver outputs for activating the optical sensors 200 and the analog signal inputs to read the signals output from the sensors 200. In particular, the controller board 505 includes a microcontroller 605 configured to communicate with the optical sensor 200 in each chute via demultiplexers 602 and a multiplexer 603. The firmware on this board 505 controls the timing of the activation of the emitters 201 of the sensors 200, the timing of the activation of the detectors 202 and the reading of the sensor signals therefrom, as well as additional filtering of the sensor signals, as discussed in detail below.

As shown in FIG. 6, the controller circuit board 505 includes six A/D converter channel inputs 606, and receives signals from 36 optical sensors 200 via 36 analog sensor inputs, by using six demultiplexers 602 connected to the six analog-to-digital (A/D) converter channel inputs 606 on the microcontroller 605. Each demultiplexer 602 takes six sensor inputs and connects them to one of the A/D channel inputs 606. Select lines 608 from the I/O port 607 of the microcontroller 605 are connected to the demultiplexers 602, and are used to select which sensor signal is received at the microcontroller 605 at any given time. The controller circuit board 505 also includes drivers 601 used to activate one or more of the sensors 200. Each of the drivers 601 shown in FIG. 6 includes six LED drive outputs, and thus, can be used to activate the emitters 201 in six of the sensors 200 at the same time. The select lines 608 are also coupled to the multiplexer 603, and are used to select which of the drivers 601 (and thus, which of the sensors 200) are currently activated. The pulse width modulation (PWM) output 609 of the microcontroller 605 generates the pulsed input signal provided to the sensors 200. In some embodiments, the PWM output 609 may provide the input signal to only the group of sensors 200 that are currently being read, which may reduce the overall system power. Although illustrated in FIG. 6 with reference to 36 sensors being activated six at a time, those skilled in the art will appreciate that fewer or more sensors, multiplexers, demultiplexers, and/or groupings of sensors may be provided.

Still referring to FIG. 6, filter circuitry 610 is provided between each demultiplexer 602 and the corresponding AID channel input 606 on the microcontroller 605. The filter circuitry 610 is configured to condition the analog electrical signal received from each sensor 200 to account for ambient light conditions, for more accurate analog measurements. For example, each optical sensor 200 may be configured to output an ambient light signal indicative of the ambient light conditions prior to output of the detection signal therefrom that indicates the presence or absence of a vial in the corresponding chute. The filter circuitry 610 may be configured to provide a filtered signal representing a difference between the detection signal and the ambient light signal, as further illustrated by signals 706', 806', and 906' in FIGS. 7C-9C. The filter circuitry 610 may include a high pass filter (dc blocking) to eliminate any background light to the sensor, a low pass filter to eliminate switching noise, an op-amp to amplify the signal, diodes to rectify the signal, and/or another low pass filter on the output to stabilize the signal. A clamp diode may also be included on the end of the filter circuitry 610 to protect the A/D channel inputs 606 of the microcontroller 605 from exceeding 3.3V. The filter circuitry 610 can be tuned to work with any desired sensor switching speed. Accordingly, any ambient light or light sources running on 60 Hz wall power may be filtered out by the filter circuitry 610.

Figure 7B:
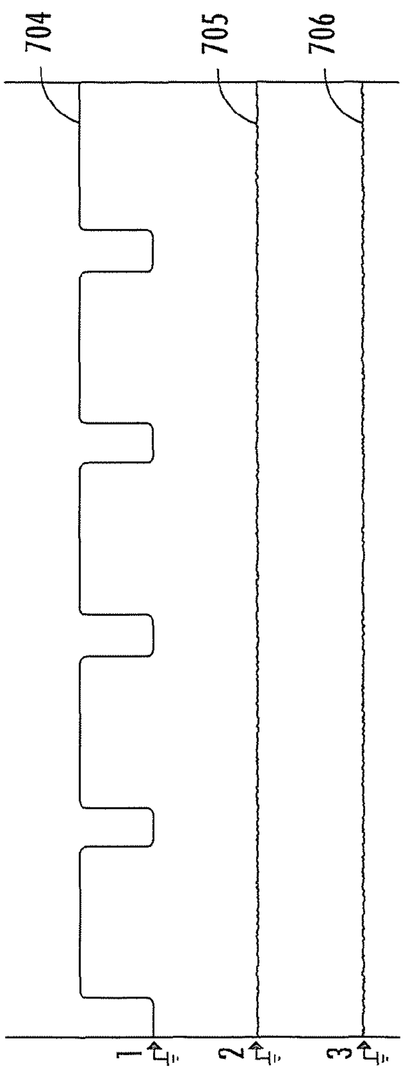
FIGS. 7A-7C illustrate chutes, sensor input, and sensor output signals when a vial is not present adjacent to the sensor in a chute unit.
Figure 7C:
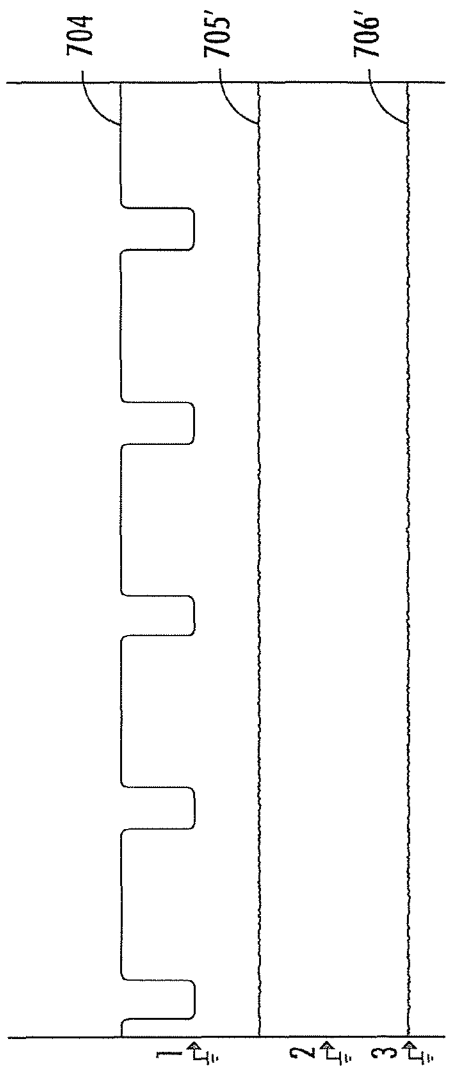
Figure 7A:
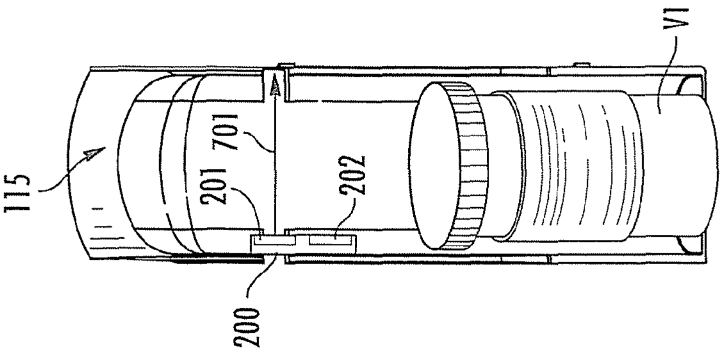
Figure 8B:
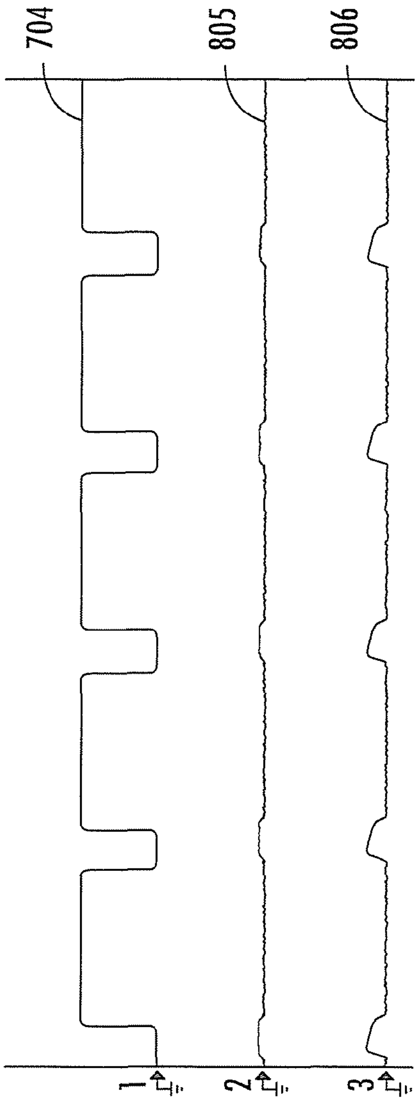
FIGS. 8A-8C illustrate chutes, sensor input, and sensor output signals when an unlabeled vial is adjacent to the sensor in the chute unit.
Figure 8C:
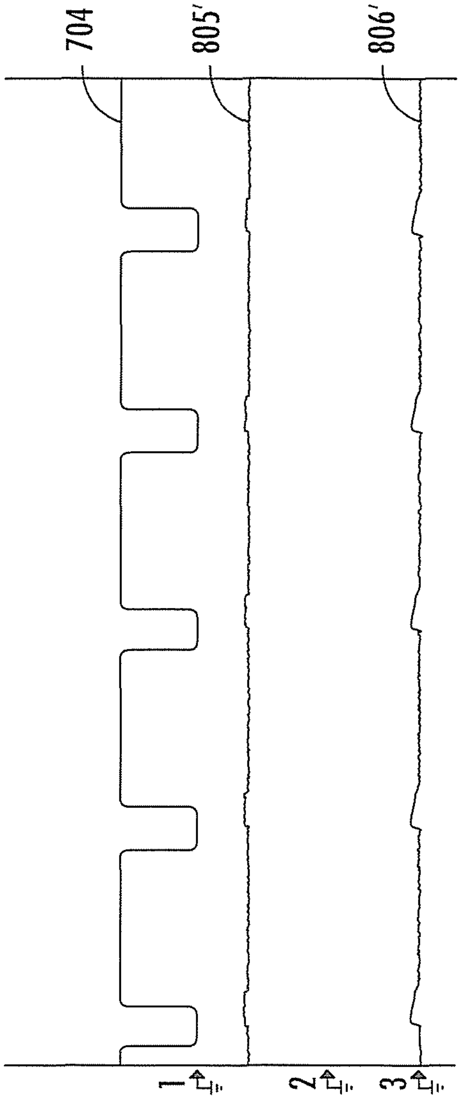
Figure 8A:
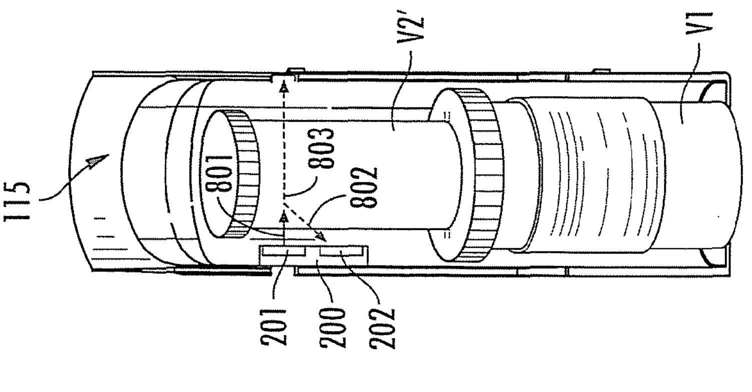
Figure 9B:
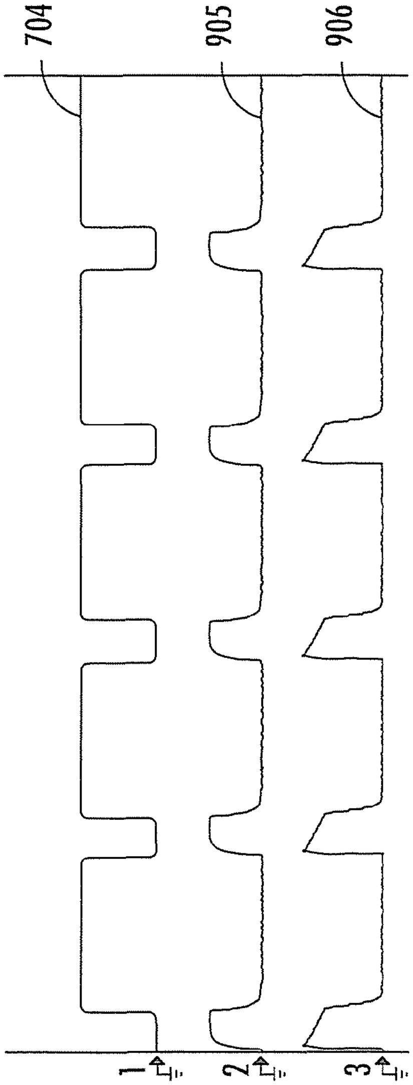
FIGS. 9A-9C illustrate chutes, sensor input, and sensor output signals when a labeled vial is adjacent to the sensor in the chute unit.
Figure 9C:
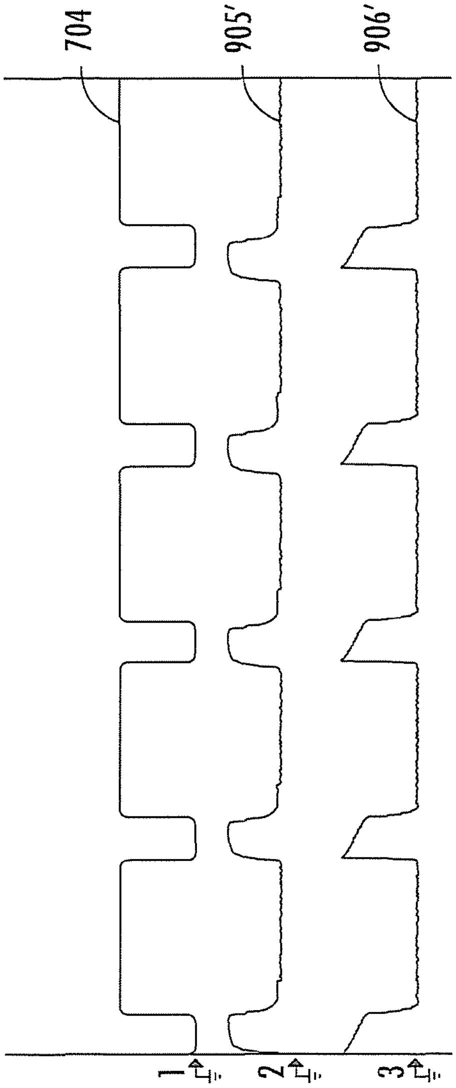

FIGS. 7A-9C illustrate the different possible chute conditions, as well as the sensor input/sensor output signals provided to/from the sensor 200 in the chute 102, and the filtered output signals provided to the A/D converter 602 of the microcontroller 605 according to some embodiments of the present invention. In particular, waveforms are shown for each of the possible states of the output chute 102—no vial present adjacent the sensor 200 (FIG. 7A), an unlabeled transparent vial present adjacent the sensor 200 (FIG. 8A), and a labeled vial present adjacent the sensor 200 (FIG. 9A). Also, each of these states are shown in two different lighting conditions—low background light (FIGS. 7B, 8B, and 9B) and high/bright background light (FIGS. 7C, 8C, and 9C).

As shown in FIGS. 7A-9C, the PWM output 609 of the microcontroller 605 of FIG. 6 generates a pulsed sensor input signal 704, which is provided to the emitter 201 in the sensor 200 via the multiplexer 603 and the corresponding driver 601. The frequency and duty cycle of the input signal 704 may be varied according to the particular conditions of operation. For example, the frequency of the input signal 704 may be about 120 Hertz (Hz) to about 1000 Hz. In some embodiments, the input signal 704 may have a frequency of about 500 Hz and a duty cycle of about 12%. The different lighting conditions illustrate how the hardware filter circuitry 610 of FIG. 6 reduces the effects of the background or ambient light on the sensor output signals. The filtered signals output by the filter circuitry 610 may be converted from analog to digital values and may be further filtered within the microcontroller 605, as discussed below with reference to FIG. 13.

Referring now to FIG. 7A, a vial V1 is at the bottom or front of the chute 102, but no vial is present in the chute 102 adjacent to the sensor 200. As such, the optical signal 701 output by the optical emitter 201 is not reflected by a vial, and thus, the intensity of the optical signal 701 received at the optical detector 202 is relatively low. As such, as shown in FIG. 7B, the optical detector 202 outputs an electrical signal 705 indicating the absence of a vial in the chute 102 adjacent the sensor 200. The sensor output signal 705 is about 0 volts, due to relatively little reflection of the optical signal 701 and the relatively low ambient light conditions. The sensor output signal 705 is thereby provided to the filter circuitry 610, which outputs the filtered signal 706. Because of the relatively low ambient light conditions in FIG. 7B, the sensor output signal 705 and the filtered signal 706 are substantially similar. FIG. 7C illustrates that the sensor output signal 705' is offset by about 2 volts as compared to the sensor output signal 705 of FIG. 7B when relatively high ambient light is present, which may result in erroneous detection. However, the filtered signal 706' still reads close to about 0 volts, as the filter circuitry 610 accounts for the high ambient light conditions, for example, by taking a difference between a signal indicative of the ambient light and the sensor output signal 705'.

As shown in FIG. 8A, a vial V1 is at the bottom or front of the chute 102, and an unlabeled transparent vial V2' is present adjacent to the sensor 200. As such, the optical signal 801 output by the optical emitter 201 is partially reflected by the vial V2' (shown by optical signal 802), and is partially transmitted through the vial V2' (shown by optical signal 803). Thus, as shown in FIG. 8B, the optical detector 202 detects the partially reflected signal 802, and outputs an electrical signal 805 representing the relative intensity of the partially reflected signal 802 received thereby. The relative intensity of the partially reflected signal 802 may exceed a threshold value that is selected based on the light transmissivity of an empty unlabeled transparent vial, and thus, is sufficient to indicate the presence of a vial in the chute 102 adjacent the sensor 200. The sensor output signal 805 is thereby provided to the filter circuitry 610, which outputs the substantially similar filtered signal 806 due to the relatively low ambient light. FIG. 8C illustrates that, when relatively high ambient light is present, the sensor output signal 805' is offset by about 2 volts as compared to the sensor output signal 805 of FIG. 8B; however, this offset is removed by the filter circuitry 610, as shown by the filtered signal 806', to account for the relatively high ambient light conditions.

Figure 9A:
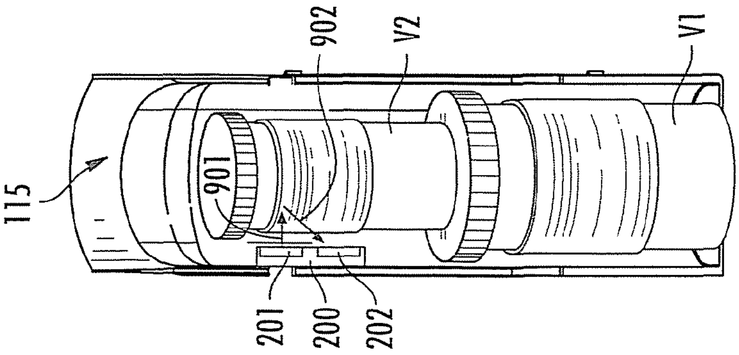

Referring now to FIG. 9A, a vial V1 is at the bottom or front of the chute 102, and a labeled transparent vial V2 is present adjacent to the sensor 200. As such, the optical signal 901 output by the optical emitter 201 is reflected by the label of the vial V2, as shown by optical signal 902, and is received at the optical detector 202. Thus, as shown in FIG. 9B, the optical detector 202 detects the reflected signal 902, and outputs an electrical signal 905 corresponding to the intensity of the received reflected signal 902, which indicates the presence of a vial in the chute 102 adjacent the sensor 200. The sensor output signal 905 is thereby provided to the filter circuitry 610, which outputs the substantially similar filtered signal 906 due to the relatively low ambient light. FIG. 9C illustrates that, when relatively high ambient light is present, the sensor output signal 905' is again offset by almost 2 volts as compared to the sensor output signal 905 of FIG. 9B; however, this offset is removed by the filter circuitry 610, as shown by the filtered signal 906', to account for the high ambient light conditions.

Although illustrated in FIGS. 7A-9C with reference to a reflective type optical sensor, those of skill in the art will appreciate that other types of optical sensors may be used. For example, a break-beam type sensor may be used in some embodiments, with the optical emitter 201 located opposite the optical detector 202 in the chute 102, and a vial may be detected based on the intensity of the optical signal that is received at the optical detector 202. In particular, when the intensity of the optical signal received at the detector 202 is less than a threshold value, the sensor output signal may indicate a presence of a vial in the chute 102. Conversely, when the intensity of the optical signal received at the detector 202 is greater than the threshold value, the sensor output signal may indicate an absence of a vial in the chute 102. Also, while illustrated in a vertical orientation in the chute 102 (with the optical emitter 201 above the optical detector 202), some embodiments of the invention may orient the optical sensors 200 such that the optical emitter 201 and optical detector 202 are provided in a horizontal and/or other relative orientation in the chute 102.

Figure 10:
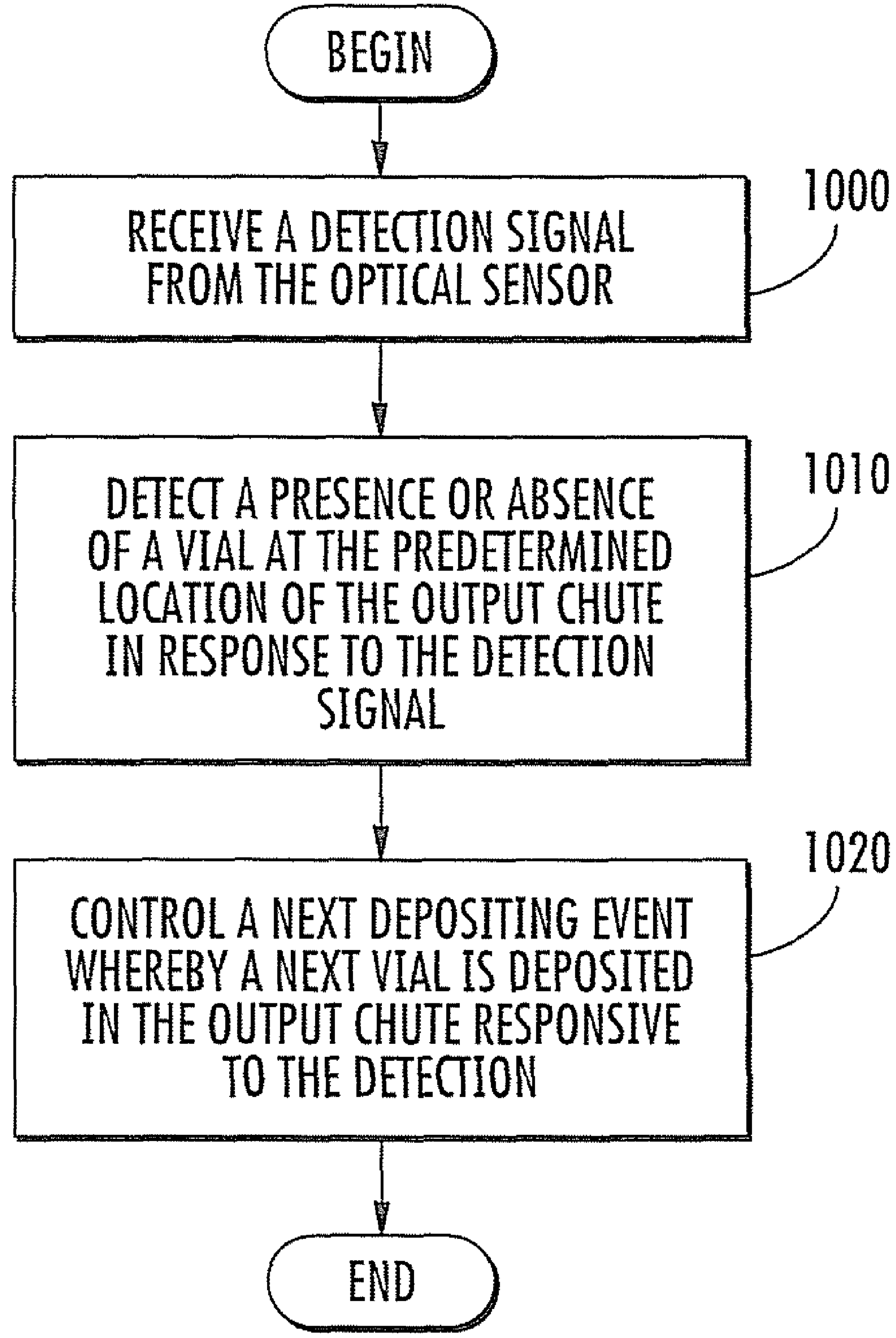
FIGS. 10 and 11 are flowcharts illustrating exemplary operations for detecting vials in an output chute in accordance with some embodiments of the present invention.

FIG. 10 illustrates example operations for detecting the presence or absence of vials in the chute 102 of the pill dispensing system 40 described above with reference to FIGS. 1-6 in response to the signals illustrated in FIGS. 7B-9C. The operations of FIG. 10 may be performed by the controller 42 of FIG. 1 and/or the controller board 505 of FIGS. 5-6. Referring now to FIG. 10, a detection signal is received from the optical sensor 200 in the output chute 102 at block 1000. The detection signal output from the sensor 200 may be filtered by hardware (such as the filter circuitry 606 described above with reference to FIG. 6) and/or software (for example, according to the operations described below with reference to FIG. 13) prior to receipt thereof at block 1000. The presence or absence of a bottle or vial at the location of the sensor 200 in the output chute 102 is detected responsive to receiving the detection signal at block 1010. For example, the controller 42 of the system 40 may detect the presence or absence of a vial in the chute 102 according to the detection signal received from the optical sensor 200, as described above with reference to FIGS. 4D and 4E. Accordingly, a next depositing event (whereby a next vial is deposited in the output chute 102) is controlled in response to the detection at block 1020. For example, responsive to detecting a presence of a vial at a top portion of the chute 102, a next vial may be deposited in an alternate output chute and/or an alert signal may be provided to the pharmacy personnel. On the other hand, in response to detecting an absence of a vial at the top portion of the chute 102, a next vial may be deposited in the output chute 102.

Figure 11:
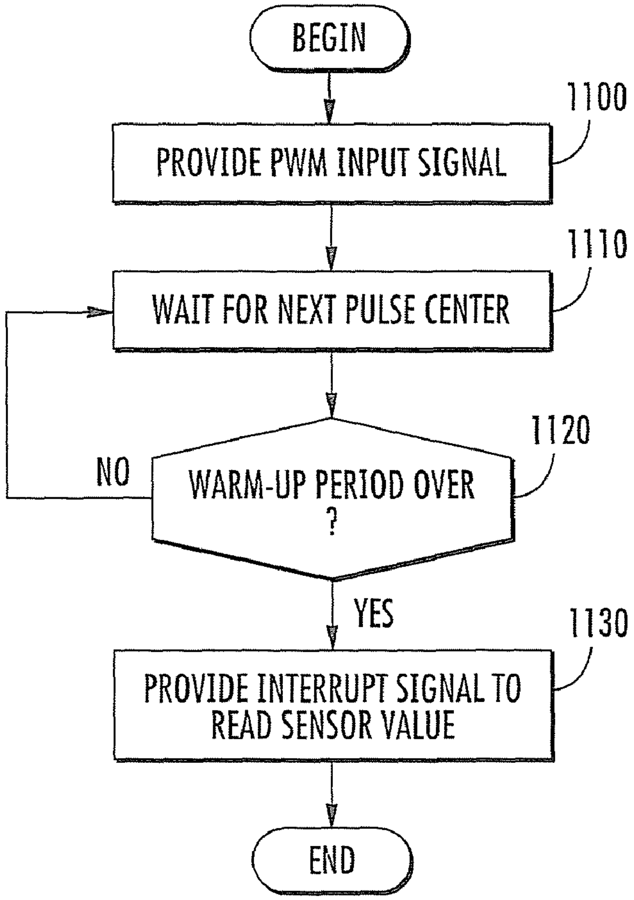

FIG. 11 illustrates operations for generating the detection signal provided from each sensor 200 in accordance with some embodiments of the present invention. Referring now to FIG. 11, a PWM signal is input to the optical sensor 200 at block 1100. As noted above, the PWM signal may be provided from the PWM output 609 of the microcontroller 605, and may have a frequency of about 500 Hz and/or a duty cycle of about 12% in some embodiments. The optical emitter 201 of the sensor 200 may output an optical signal according to the duty cycle and/or frequency of the PWM input signal. As discussed above with reference to FIG. 6, the optical emitters 201 of six different sensors 200 may be activated in parallel in response to the PWM input signal. The PWM input signal is monitored, and at block 1110, it is determined that a center or midpoint of the next pulse of the PWM signal has arrived. At block 1120, it is determined whether a "warm-up" period (e.g., a period during which the optical emitter 201 may be cycled on/off prior to taking samples via the optical detector 202) has expired. In some embodiments, the warm-up period may correspond to about 10 PWM cycles. If it is determined at block 1120 that the warm-up period has not expired, operations return to block 1110, where the center of the next pulse is awaited. However, if it is determined at block 1120 that the warm-up period has expired, an interrupt signal is provided to the optical detector 202 in each sensor 200 at about the midpoint of the current pulse at block 1130. The interrupt signal may be provided in response to each subsequent pulse of the PWM input signal for a desired number of cycles, for example, about 50 cycles in some embodiments. The optical detector 202 of each currently-active sensor 200 is activated in response to each interrupt signal to provide a pulsed output signal from each sensor 200. The pulsed output signal indicates read values output from the sensor 200 for a reading period corresponding to the desired number of cycles, which may be correlated to present sample values and used to determine the presence or absence of a vial in the chute 102. Once all read values for the currently-active group of sensors 200 have been taken, the next group of sensors 200 are selected (for example, using the select lines 608 of FIG. 6), and the process is repeated.

Figure 12:
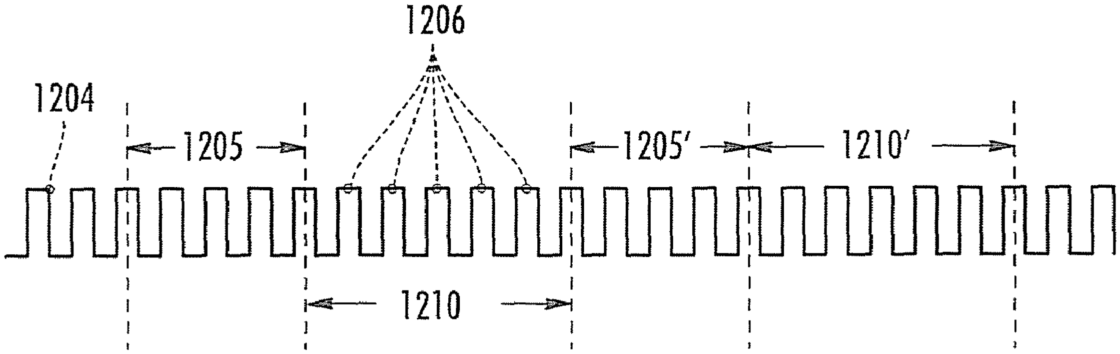
FIG. 12 is a graph illustrating sensor operation in accordance with some embodiments of the present invention.

FIG. 12 further illustrates the PWM input signal (including the warm-up and reading periods) used to operate the sensor 200 and the timing of the interrupt signals described above with reference to FIG. 11. As shown in FIG. 12, a center aligned PWM scheme (e.g., a PWM load scheme where the interrupt is provided in the middle of the PWM active time) is used to provide a consistent sensor output. In particular, a PWM signal 1200 is input to the optical emitter 201 in the sensor 200 (and in some embodiments, to six emitters 201 in parallel) for a predetermined number of cycles before activation of the corresponding optical detector 202, to provide the emitter 201 with a "warm-up" period 1205 before sample values are taken. For example, the warm-up period 1205 may correspond to about 10 PWM cycles in some embodiments. Once the warm-up period 1205 has expired, a PWM reload interrupt signal is input to the optical detector 202 in each activate sensor 200 at about a midpoint 1206 of each pulse 1204 of the PWM signal 1200. The interrupt signal is used to trigger reading by the sensors 200. In particular, the optical detector 202 of each sensor 200 is activated in response to each interrupt signal, and thus, the read values output therfrom correspond to approximately the midpoint of the activation of the corresponding optical emitter 201. Accordingly, the timing of the reading of each detector 202 may be highly repeatable with respect to the activation of the corresponding emitter 201.

Multiple samples from different sensors 200 may be taken in parallel during each reading period 1210. For example, as discussed above with reference to FIG. 6, six sensors 200 may be read in parallel by the microcontroller 605 via the six A/D converter inputs 606. The reading period 1210 may be about 50 PWM cycles in some embodiments. After the reading period 1210, the PWM signal 1200 is activated for the next group of sensors 200, with a similar warm-up period 1205' and reading period 1210'.

Figure 13:
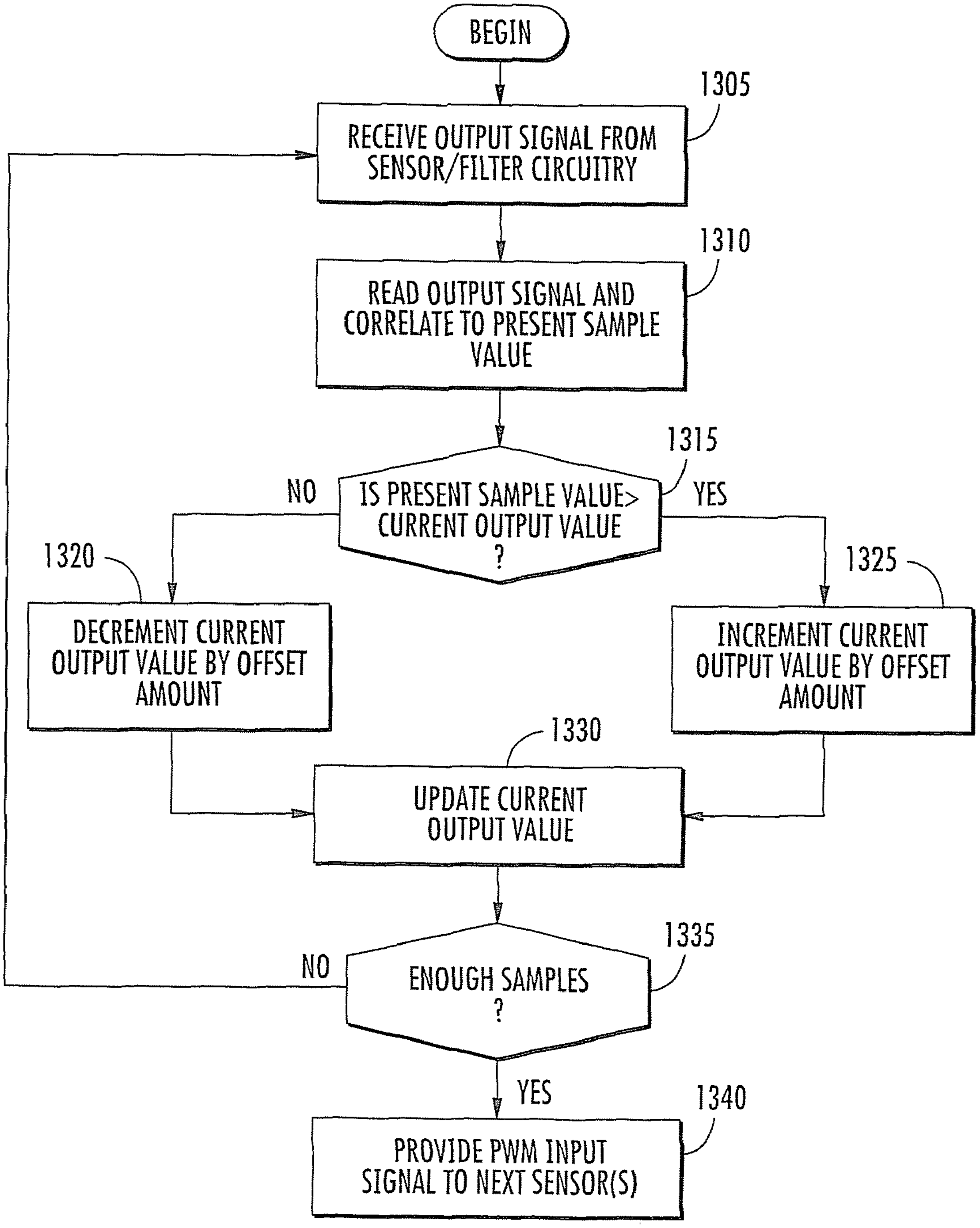
FIG. 13 is a flowchart illustrating further exemplary operations for detecting vials in an output chute in accordance with some embodiments of the present invention.

FIG. 13 illustrates an algorithm that may be used to filter the detection signals output from the sensors 200. In some embodiments, the operations of FIG. 13 may be carried out by the microcontroller 605 to further filter the filtered output signals from the filter circuitry 610. As shown in FIG. 13, in response to an output signal from a sensor 200 at block 1305 (which may be triggered by a PWM reload interrupt signal as described above), the output signal is read and correlated to a present sample value at block 1310. A comparison between the present sample value and a current output value is performed at block 1315. The current output value may be based on a previous sample value provided by the sensor 200. If the comparison at block 1315 indicates that the present sample value is less than the current output value, the current output value is decremented by a predetermined offset value at block 1320. On the other hand, if the comparison at block 1315 indicates that the present sample value is greater than the current output value, the current output value is incremented by the predetermined offset value at block 1325. Accordingly, the current output value is updated at block 1330 by moving the output value up or down a fixed amount for each sample value. This may reduce or prevent jitter in the output, to provide a relatively stable signal with a slow response time. This relatively stable signal is thereby used to detect the presence or absence of a vial in the chute 102, and thus, to determine whether or not additional vials can be placed in the chute 102. As discussed above, the operations of blocks 1305, 1310, 1315, 1320, 1325, and 1330 may be performed in parallel for the respective output signals from multiple sensors 200.

Still referring to FIG. 13, at block 1335, it is determined whether a sufficient number of samples have been taken for the currently active sensor(s) 200. For example, as noted above, 50 samples may be taken during a reading period in some embodiments. If it is determined that a sufficient number of samples have been taken at block 1335, the PWM input signal is provided to a next sensor 200 or group of sensors 200 at block 1340. However, if it is determined that a sufficient number of samples have not been taken at block 1335, operations return to block 1305 to await the next sensor output signal.

The flowcharts of FIGS. 10, 11, and 13 illustrate the architecture, functionality, and operations of embodiments of hardware and/or software according to various embodiments of the present invention. It will be understood that each block of the flowchart and/or block diagram illustrations, and combinations of blocks in the flowchart and/or block diagram illustrations, may be implemented by computer program instructions and/or hardware operations. In this regard, each block represents a module, segment, or portion of code, which comprises one or more executable instructions for implementing the specified logical function(s).

It should be noted that, in other implementations, the function(s) noted in the blocks may occur out of the order noted in FIGS. 10, 11, and 13. For example, two blocks shown in succession may, in fact, be executed substantially concurrently, or the blocks may sometimes be executed in the reverse order, depending on the functionality involved. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Embodiments of the present invention are designed to work with many different bottle or vial configurations, and in different ambient lighting conditions. Thus, switching the sensors on/off in combination with the custom sensor signal filtering described herein can provide a robust solution to improve the efficiency and operation of robotic pharmaceutical dispensing systems. Also, by automatically detecting the presence of vials in the output chutes in accordance with embodiments of the present invention, the pharmacist and/or other operator is no longer required to scan each vial out of the system when removing a vial from a chute, which may reduce the potential for errors. Systems according to embodiments of the present invention may also automatically detect when chutes are full and place vials in alternate chutes, which may result in less stoppage of the system.

The foregoing is illustrative of the present invention and is not to be construed as limiting thereof. Although a few exemplary embodiments of this invention has been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:

1. An automated pill dispensing system, comprising:

an output chute configured to hold pill-containing vials;

an optical sensor located at a predetermined location in the output chute, the optical sensor comprising an optical emitter and an optical detector configured to be operated cooperatively to output a detection signal indicating a presence or absence of a vial at the predetermined location of the output chute; and a controller coupled to the optical sensor and configured to receive the detection signal output therefrom, detect the presence or absence of the vial at the predetermined location of the output chute in response to the detection signal, and control a next depositing event whereby a next vial is deposited responsive to the detection, wherein the predetermined location comprises a top portion of the output chute, and wherein the controller is configured to control the next depositing event to deposit the next vial in an alternate output chute responsive to detecting the presence of the vial at the top portion of the output chute.

2. The system of claim 1, wherein the controller is configured to control the next depositing event to deposit the next vial in the output chute responsive to detecting the absence of the vial.

3. An automated pill dispensing system, comprising:

an output chute configured to hold pill-containing vials;

an optical sensor located at a predetermined location in the output chute, the optical sensor comprising an optical emitter and an optical detector configured to be operated cooperatively to output a detection signal indicating a presence or absence of a vial at the predetermined location of the output chute; and a controller coupled to the optical sensor and configured to receive the detection signal output therefrom, detect the presence or absence of the vial at the predetermined location of the output chute in response to the detection signal, and control a next depositing event whereby a next vial is deposited in the output chute responsive to the detection, wherein the controller is configured to increment a counter value in response to each depositing event to count a number of vials deposited in the chute, and alter the counter value responsive to the detection signal from the optical sensor indicating the presence or absence of the vial at the predetermined location of the output chute.

4. The system of claim 3, wherein the optical sensor is configured to output an ambient light signal indicative of the ambient light conditions prior to output of the detection signal therefrom, and further comprising a filter circuit configured to adjust the detection signal to represent a difference between the detection signal and the ambient light signal.

5. The system of claim 3, wherein the controller is configured to:

correlate the detection signal to a present sample value;

compare the present sample value to a current output value, wherein the current output value is based on a previous sample value;

increment or decrement the current output value by an offset value in response to the comparison to update the current output value; and detect the presence or absence of the vial at the predetermined location of the output chute responsive to the updated current output value.

6. The system of claim 3, wherein:

the controller is configured to provide a pulsed input signal to operate the optical sensor;

the controller is configured to provide an interrupt signal to the optical sensor at about a midpoint of each pulse of the pulsed input signal; and the optical detector is configured to be activated in response to each interrupt signal to provide a pulsed output signal as the detection signal.

7. The system of claim 6, wherein the controller is configured to allow a predetermined number of pulses of the pulsed input signal prior to providing the interrupt signal.

8. The system of claim 3, wherein, when the counter value indicates that the chute is full, the controller is configured to decrease the counter value to a predetermined counter value responsive to detecting the absence of the vial at the predetermined location of the output chute based on the detection signal.

9. The system of claim 8, wherein the predetermined counter value corresponds to the predetermined location of the optical sensor in the output chute.

10. The system of claim 3, wherein the predetermined location comprises a top portion of the output chute, and wherein, when the counter value indicates that the chute is not full, the controller is configured to increase the counter value to a predetermined counter value indicating that the chute is full responsive to detecting the presence of the vial at the top portion of the output chute based on the detection signal.

11. The system of claim 3, wherein the controller is further configured to control the next depositing event in response to the altered counter value.

12. The system of claim 11, wherein the controller is configured to control the next depositing event to deposit the next vial in the output chute when the altered counter value is less than a predetermined counter value indicating that the chute is full, and to deposit the next vial in an alternate output chute when the altered counter value is greater than or equal to a counter value indicating that the chute is full.

13. The system of claim 3, wherein:

the optical sensor comprises a reflective type sensor;

the optical emitter is configured to output an optical signal in response to a signal from the controller;

the optical detector is configured to output an electrical signal representative of a portion of the optical signal received at the optical detector as the detection signal;

the controller is configured to detect the presence of the vial in the predetermined location responsive to the electrical signal indicating that an intensity of the optical signal received at the optical detector exceeds a threshold value; and the controller is configured to detect the absence of the vial in the predetermined location responsive to the electrical signal indicating that the intensity of the optical signal received at the optical detector is less than the threshold value.

14. The system of claim 3, wherein:

the optical sensor comprises a break-beam type sensor;

the optical emitter is configured to output an optical signal in response to a signal from the controller;

the optical detector is configured to output an electrical signal representative of a portion of the optical signal received at the optical detector as the detection signal;

the controller is configured to detect the presence of the vial in the predetermined location responsive to the electrical signal indicating that an intensity of the optical signal received at the optical detector is less than a threshold value; and the controller is configured to detect the absence of the vial in the predetermined location responsive to the electrical signal indicating that the intensity of the optical signal received at the optical detector exceeds the threshold value.

15. A method of operating an automated pill dispensing system including an output chute configured to hold pill-containing vials and an optical sensor at a predetermined location therein, the method comprising:

receiving a detection signal from the optical sensor;

detecting a presence or absence of a vial at the predetermined location of the output chute responsive to the detection signal;

controlling a next depositing event whereby a next vial is deposited in the output chute responsive to the detecting of the presence or absence of the vial at the predetermined location of the output chute;

incrementing a counter value in response to each depositing event to count a number of vials deposited in the chute; and altering the counter value responsive to the detecting of the presence or absence of the vial at the predetermined location of the output chute.

16. The method of claim 15, further comprising:

receiving an ambient light signal indicative of the ambient light conditions from the optical sensor and adjusting the detection signal output from the optical sensor to represent a difference between the detection signal and the ambient light signal prior to detecting the presence or absence of the vial responsive thereto.

17. The method of claim 16, further comprising:

correlating the detection signal to a present sample value;

comparing the present sample value to a current output value, wherein the current output value is based on a previous sample value; and incrementing or decrementing the current output value by an offset value in response to the comparison to provide an updated current output value, wherein detecting the presence or absence of the vial comprises detecting the presence or absence of the vial at the predetermined location of the output chute responsive to the updated current output value.

18. The method of claim 15, wherein altering the counter value comprises:

decreasing the counter value to a predetermined counter value responsive to detection of the absence of the vial at the predetermined location of the output chute when the counter value indicates that the chute is full.

19. The method of claim 15, wherein the predetermined location comprises a top portion of the output chute, and wherein altering the counter value comprises:

increasing the counter value to a predetermined counter value indicating that the chute is full responsive to detection of the presence of the vial at the top portion of the output chute when the counter value indicates that the chute is not full.

20. The method of claim 15, wherein controlling the next depositing event comprises controlling the next depositing event based on the altered counter value.

21. The method of claim 20, wherein controlling the next depositing event comprises:

depositing the next vial in the output chute when the altered counter value is less than a predetermined counter value indicating that the chute is full; and depositing the next vial in an alternate output chute when the altered counter value is greater than or equal to a counter value indicating that the chute is full.

* * * * *